United States Patent
Lutzka et al.

(10) Patent No.: US 8,197,007 B2
(45) Date of Patent: Jun. 12, 2012

(54) COMBINATION PIVOTAL AND DISPLACEABLE HEADREST ASSEMBLY INCORPORATED INTO A VEHICLE SEAT

(75) Inventors: Tavis Lutzka, Davisberg, MI (US); Stephen Bruck, Howell, MI (US); Jason Hamilton, Highland, MI (US); David L. Quittschreiber, Milford, MI (US)

(73) Assignee: BAE Industries, Inc., Warren, MI (US)

( * ) Notice: Subject to any disclaimer, the term of this patent is extended or adjusted under 35 U.S.C. 154(b) by 351 days.

(21) Appl. No.: 12/611,295

(22) Filed: Nov. 3, 2009

(65) Prior Publication Data

US 2011/0101762 A1    May 5, 2011

(51) Int. Cl.
A47C 1/10    (2006.01)
(52) U.S. Cl. ......... 297/408; 297/391; 297/404; 297/406
(58) Field of Classification Search .............. 297/391, 297/403–404, 406–409
See application file for complete search history.

(56) References Cited

U.S. PATENT DOCUMENTS

| | | | |
|---|---|---|---|
| 4,796,953 A | | 1/1989 | Pereira |
| 5,145,233 A | * | 9/1992 | Nagashima ............ 297/408 |
| 5,484,189 A | | 1/1996 | Patterson |
| 5,590,933 A | | 1/1997 | Andersson |
| 5,664,841 A | * | 9/1997 | Dal Monte ............ 297/408 |
| 5,681,079 A | | 10/1997 | Robinson |
| 5,927,804 A | | 7/1999 | Cuevas |
| 6,024,405 A | | 2/2000 | MacAndrew et al. |
| 6,045,181 A | | 4/2000 | Ikeda et al. |
| 6,074,011 A | | 6/2000 | Ptak et al. |
| 6,192,565 B1 | | 2/2001 | Tame |
| 6,270,161 B1 | | 8/2001 | De Filippo |
| 6,485,096 B1 | * | 11/2002 | Azar et al. ............ 297/61 |
| 6,612,653 B2 | | 9/2003 | Takata |
| 6,702,385 B2 | | 3/2004 | Holdampf et al. |
| 6,726,283 B2 | | 4/2004 | Schambre et al. |
| 6,880,890 B1 | | 4/2005 | DeBrabant |
| 6,935,696 B2 | * | 8/2005 | Gauthier et al. ............ 297/408 |
| 7,048,334 B2 | | 5/2006 | Pal et al. |
| 7,066,545 B2 | | 6/2006 | Terada et al. |
| 7,118,174 B2 | | 10/2006 | Lee |
| 7,140,687 B2 | | 11/2006 | Hoekstra et al. |
| 7,226,124 B2 | | 6/2007 | Mori et al. |
| 7,322,646 B2 | | 1/2008 | Jammalamadaka et al. |

(Continued)

FOREIGN PATENT DOCUMENTS

EP    2039562 A1    3/2009

(Continued)

*Primary Examiner* — Laurie Cranmer
(74) *Attorney, Agent, or Firm* — Gifford, Krass, Sprinkle, Anderson & Citkowski, P.C.

(57) ABSTRACT

A pivoting headrest assembly having a pivotally supported and cable actuated hook secured to fixed bracket. The hook engages a pin associated with a widthwise extending and upwardly biased support secured within a pair of side channels associated with the fixed bracket. Upon triggering the release of the hook, the support is upwardly displaced within the side channels. A pair of end supported pivotal linkages are secured in coaxial fashion with the ends of the displaceable support. Upper ends of the linkages pivotally engage a base plate of an upper pivotally driven headrest bun support offset from a pivotal engagement established between the base plate and upper end of the headrest bracket. The linkages are configured so that upward displacement exerted by the support is converted to the forward dump rotation of the headrest bun support.

23 Claims, 8 Drawing Sheets

U.S. PATENT DOCUMENTS

| | | |
|---|---|---|
| 7,325,877 B2 | 2/2008 | Brockman et al. |
| 7,341,312 B2 | 3/2008 | Gauthier et al. |
| 7,350,859 B2 | 4/2008 | Klukowski |
| 7,367,626 B2 | 5/2008 | Lawall et al. |
| 7,429,082 B2 | 9/2008 | Kraft et al. |
| 7,484,796 B2 * | 2/2009 | Fischer et al. ........... 297/216.12 |
| 7,484,808 B2 * | 2/2009 | Yetukuri et al. .............. 297/408 |
| 7,575,282 B2 * | 8/2009 | Sutter et al. ................... 297/403 |
| 7,673,938 B2 * | 3/2010 | Yamaguchi et al. ..... 297/216.12 |
| 2001/0002764 A1 | 6/2001 | Fischer et al. |
| 2005/0225146 A1 | 10/2005 | Sutter et al. |
| 2006/0012233 A1 | 1/2006 | Karlberg |
| 2006/0250017 A1 | 11/2006 | Otto et al. |
| 2007/0236070 A1 | 10/2007 | Brockman |
| 2008/0001456 A1 | 1/2008 | Muller et al. |
| 2008/0036250 A1 | 2/2008 | Kim |
| 2009/0167066 A1 | 7/2009 | Mori et al. |
| 2009/0261635 A1 | 10/2009 | Yamaguchi et al. |
| 2010/0052379 A1 | 3/2010 | Otsuka |

FOREIGN PATENT DOCUMENTS

| | | |
|---|---|---|
| EP | 2106963 A1 | 10/2009 |
| EP | 2116416 A1 | 11/2009 |
| GB | 2432784 A | 6/2007 |
| JP | 2009202785 A | 9/2009 |

* cited by examiner

US 8,197,007 B2

COMBINATION PIVOTAL AND DISPLACEABLE HEADREST ASSEMBLY INCORPORATED INTO A VEHICLE SEAT

FIELD OF THE INVENTION

The present invention relates generally to pivoting or foldable headrest assemblies. More specifically, the present invention discloses a pivoting headrest assembly incorporating a pivotally supported and cable actuated hook winch engages a widthwise extending and upwardly biased support secured within a pair of side channels associated with a fixed bracket. Upon triggering the release of the hook, the support is upwardly displaced within the side channels along with a pair of end supported pivotal linkages secured in coaxial fashion with the displaceable support. Upper ends of the linkages pivotally engage a base plate of an upper pivotally driven headrest bun support frame, offset from a pivotal engagement of the base plate relative to an upper end of the headrest bracket. The side positioned and upwardly displaceable linkages are configured so that upward displacement caused by the widthwise support is exerted through the linkages and is converted to a forward dump rotation of the headrest bun frame about the pivot established between the base plate and the bracket.

BACKGROUND OF THE INVENTION

The prior art is documented with numerous examples of folding headrest restraint mechanisms. One known purpose of such mechanisms is to reduce an overall height profile of a rear foldable seat, in particular so that the seat can be forwardly dumped (and selectively forwardly rotated) in a fashion so that it does not interfere with a forwardly located seat.

Examples of such headrest folding mechanisms include that disclosed in Robinson 5,681,079, and which includes a headrest latch mechanism operable in a locked mode for releasably latching a headrest in an upright/use position, as well as in a released mode for permitting movement of the headrest toward a forward dump position. A separate latch release mechanism is employed to permit the headrest latch mechanism to be selectively shifted from the locked mode into the released mode. In a preferred application, the latch release mechanism interconnects the headrest latch mechanism to a seatback latch mechanism such that the headrest latch mechanism is released upon the seatback latch mechanism being shifted to an unlatched mode, and due to actuation of the latch release mechanism.

Another example of an articulating head restraint mechanism is set forth in Gautheir 6,935,696, and which discloses an armature with a cam. The cam includes a lock acumination (point tapering) and a stop acumination. The armature fits within a structure composed of a bracket and a slave bracket. A slide, attached to a cable, rides within a slot on the bracket. When the slide is in a locked position, the tapered acumination of the cam presses against the slide, thereby restraining its movement. Upon sufficient force being applied to the cable, the slide moves within the slot to an unlocked position, at which point a torsion spring wrapped around the armature causes the armature to rotate to a forward stowed position.

A further example of an automatic retractable headrest is set forth in U.S. Pat. No. 6,074,011, issued to Ptak, and which teaches the headrest as rotatable between an upright use position to a lowered, retracted and stowed position. A motion mechanism is contained within the body of the head rest, the head rest further being vertically adjustable relative to the seat back and being rotatably adjustable within a range of uprights use positions.

Other noteworthy examples of foldable headrest restraints include those set forth in U.S. Pat. No. 7,325,877 (Brockman), 2005/0225146 Sutter, Jr. and 2007/0236070(Brockmen).

SUMMARY OF THE INVENTION

The present invention discloses a pivoting headrest assembly incorporating a pivotally supported and cable actuated hook which engages a widthwise extending and upwardly biased support secured within a pair of side channels associated with a fixed bracket. Upon triggering the release of the hook, the support is upwardly displaced within the side channels along with a pair of end supported pivotal linkages secured in coaxial fashion with the displaceable support. Upper ends of the linkages pivotally engage a base plate component of a headrest frame, offset from a pivotal engagement of the base plate relative to an upper end of the headrest bracket. The side positioned and upwardly displaceable linkages are configured so that upward displacement of the support and pivotally affixed linkages is converted to a forward dump rotation of the headrest frame about its pivot with the bracket.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Referring now to each of FIGS. 1-9, a series of exploded perspective, plan and operational views are shown of pivoting headrest assembly 10 according to the present invention. As further illustrated in each of FIGS. 5-9 in succession, the headrest assembly 10 is incorporated into an upper portion of a seatback 12, such that the assembly supports a headrest bun 14 arranged over a top surface of the seatback. The headrest assembly, as will be described in additional detail, can be incorporated into such as a rear row vehicle seat and, upon being forwardly dumped relative to the seatback, reduce an overall height component of the seatback, such that it can be forwardly rotated to a fold flat or dump and tumble condition, this without interfering with either or both of a forward row of seat of a floor of a vehicle.

Figure 1:
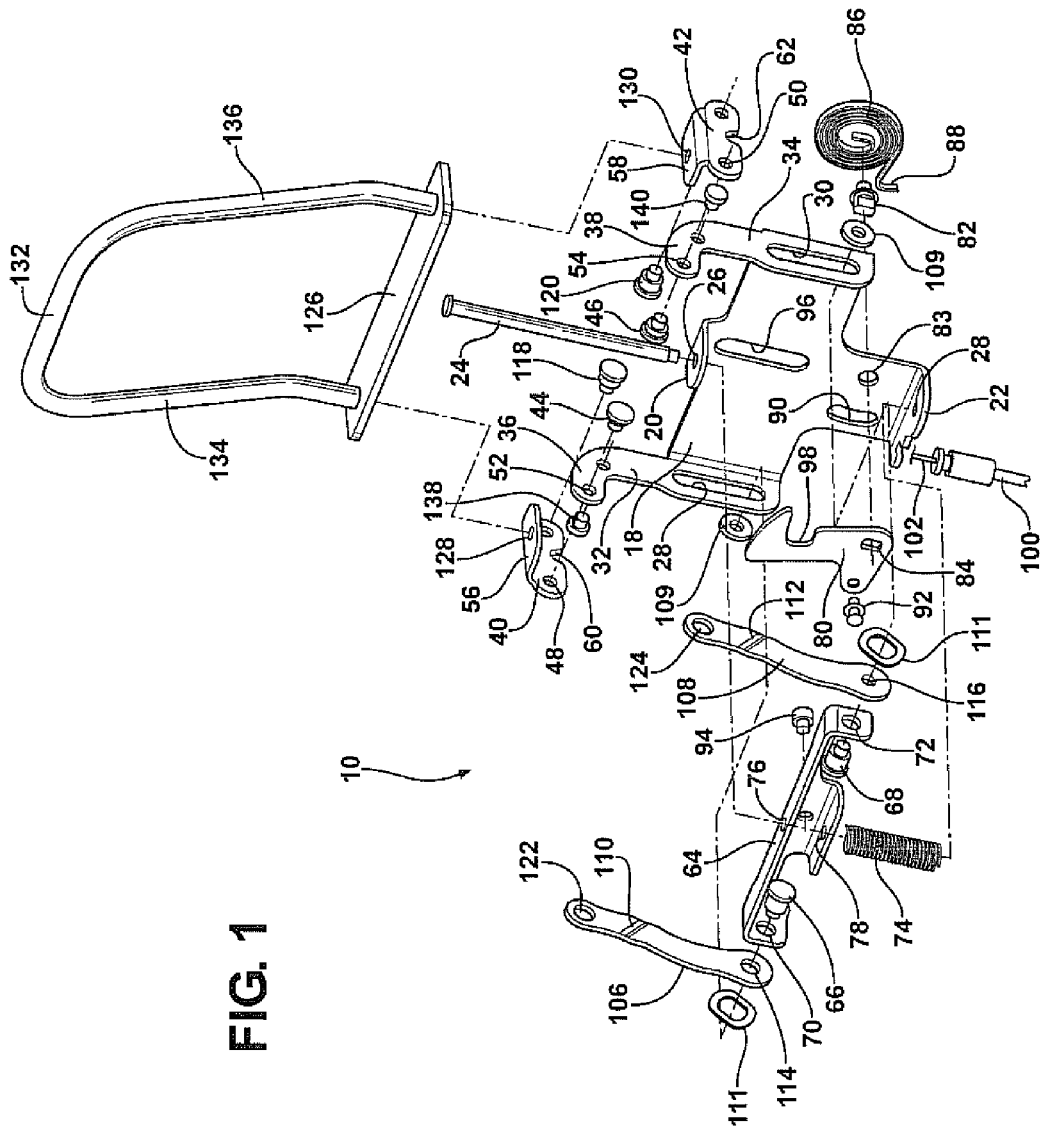
FIG. 1 is an exploded view of the headrest assembly, including the release hook, upwardly displaceable support with pivotally and linearly displaceable linkages secured to the headrest bracket and for exerting a converted pivotal actuation of an upper pivotally supported headrest bun according to the present invention.
Figure 5:
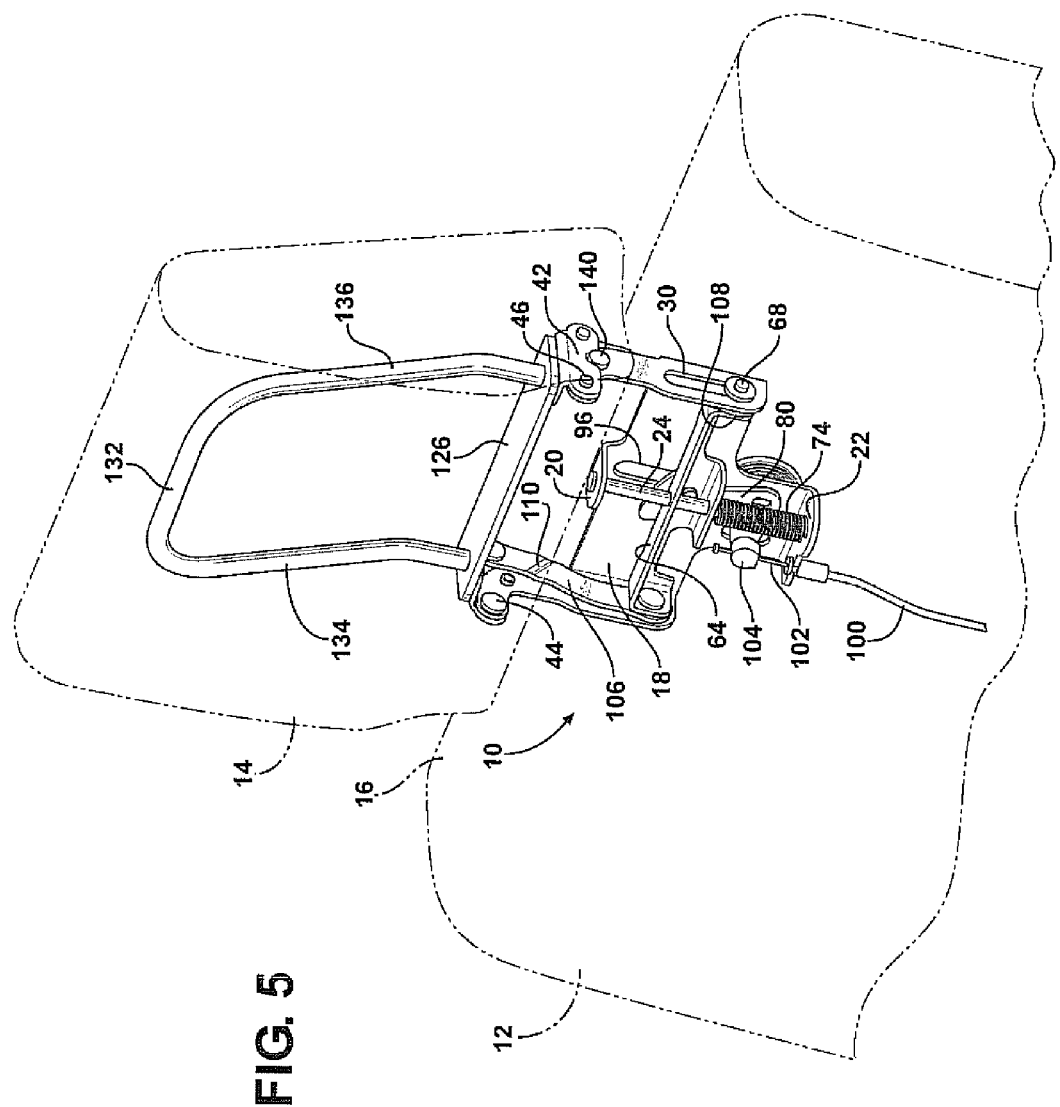
FIG. 5 is an environmental view of the headrest assembly shown in FIG. 2 incorporated into a seat back and supporting thereupon a headrest bun.

Referring to the exploded view of FIG. 1, in cooperation with the upright design position of FIG. 5, the headrest assembly 10 includes a bracket incorporated into an interior cavity formed in an upper portion of the vehicle seatback 12 and extending from a top surface 16 of the seatback. The bracket includes a central portion 18 exhibiting a substantially planar shape as shown. A first pair of turned upper and lower tabs are shown, at 20 and 22 respectively, these defining mounting and support locations associated with the bracket and for receiving a guide rod 24 thorough apertures 26 and 28 defined in the support tabs 20 and 22.

The bracket further includes first 28 and second 30 channels (FIG. 1) defined in angularly disposed side portions 32 and 34, between which are seated opposite ends of the support. The angularly disposed side portions 32 and 34 of the bracket terminate in upper arcuately configured ends see at 36 and 38, as again best shown in FIG. 1 and which project from the upper edge 16 of the seatback 12 as shown in FIG. 5. A pair of headrest frame support portions, at 40 and 42, are pivotally secured to the upper configured ends 36 and 38 of bracket, see mounting rivets 44 and 46 which mount through forwardly positioned apertures 48 and 50 (again FIG. 1) defined through the frame support portions 40 and 42 and which align with additional apertures 52 and 54 in the upper arcuately configured ends 36 and 38. As further shown, the support portions 40 and 42, each exhibit a planar and angular extending upper surface, at 56 and 58, and a configured underside recess 60 and 62.

A support 64 is provided and exhibits a widthwise extending component which is supported between, and in linearly displaceable fashion along, the elongate channels 28 and 30 in the bracket angled side portions 32 and 34, via side extending pins 66 and 68 extending through aligning apertures 70 and 72 in angled end portions of the support 64. A coil spring 74 is supported upon the guide rod 24, and biases an underside of the support 64 in a direction away from the first (lower) mounting end location 22, and toward the second (upper) mounting end location 20. As further shown, the guide rod 24 seats through centrally located apertures, see at 76 and 78 (again as best shown in FIG. 1), defined in aligned fashion at central locations associated with the displaceable support 64.

The support 64 is maintained in a first (design) position exhibited by the associated headrest component by a trigger located upon the bracket, and which is further illustrated by a hook shaped component 80 pivotally secured (via pin 82 which seats through aperture 83 in the bracket and aperture 84 in the hook 80) in biased fashion to the bracket and approximate the lower rod mounting location 22. A clock spring 86 is secured to a rear face of the central portion 18 of the bracket and includes a leg 88 communicable through an aperture 90 in the central portion 18, this for biasing a hook supported rivet 92 (mounted to the hook 80 a spaced distance from its pivot point 82) toward the first (upright) design position.

A pill 94 extends from an intermediate (rear) location of the displaceable support 64 and seats within a channel 96 defined in the central portion 18 of the bracket. The hook 80 is positioned in sandwiching fashion between the rear surface of the support 64 and the front surface of the central portion 18 of the bracket, such that an arcuate catch section 98 of the hook 80 engages the pin 94 in its normally biased direction, this again corresponding to the first upright design position.

Figure 2:
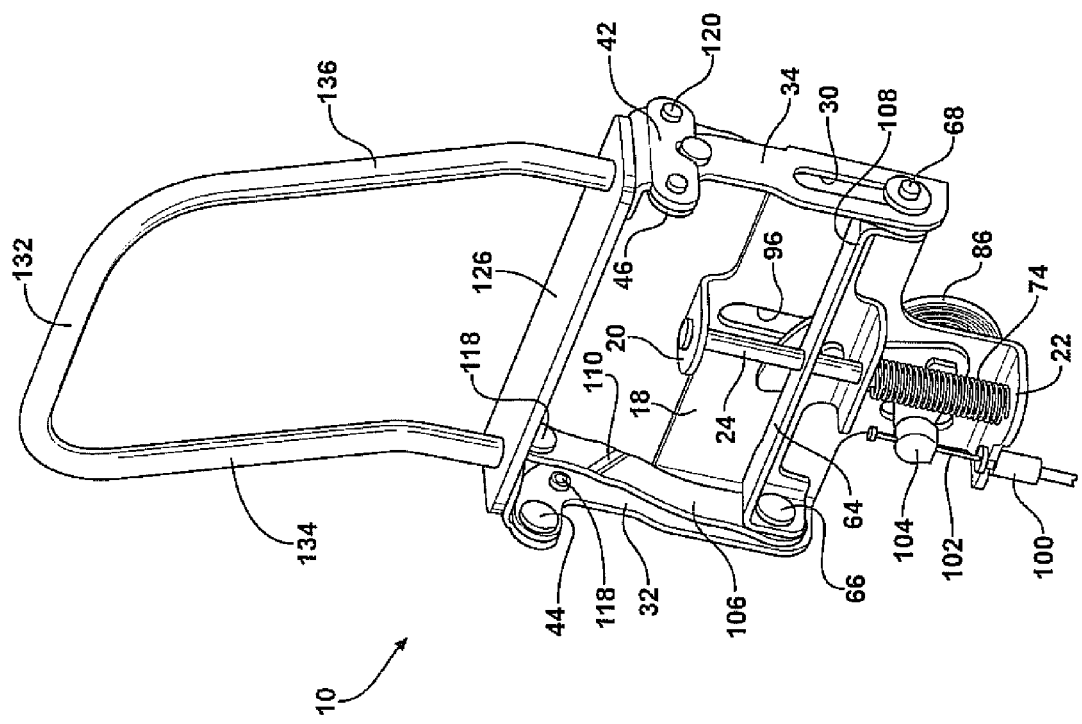
FIG. 2 is an assembled perspective view of the headrest assembly shown in FIG. 1.
Figure 4:
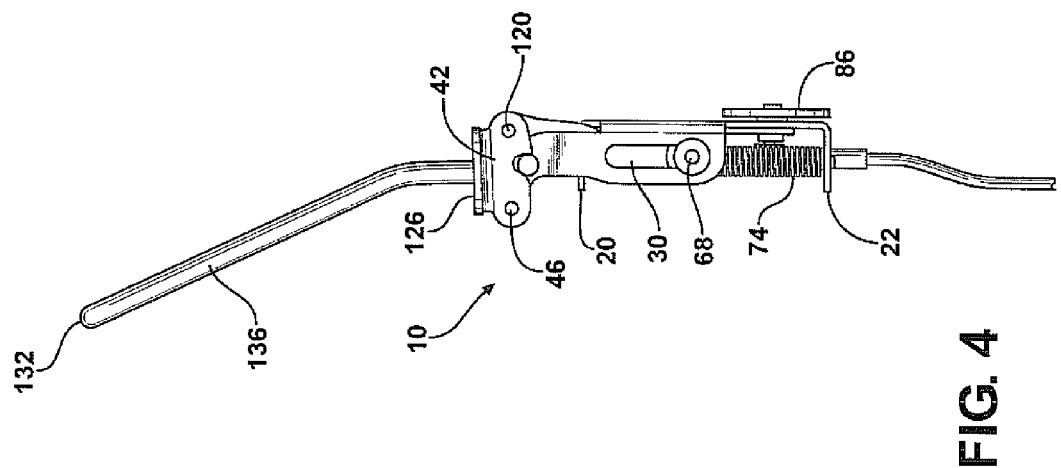
FIG. 4 is a side plan view of the headrest assembly.
Figure 3:
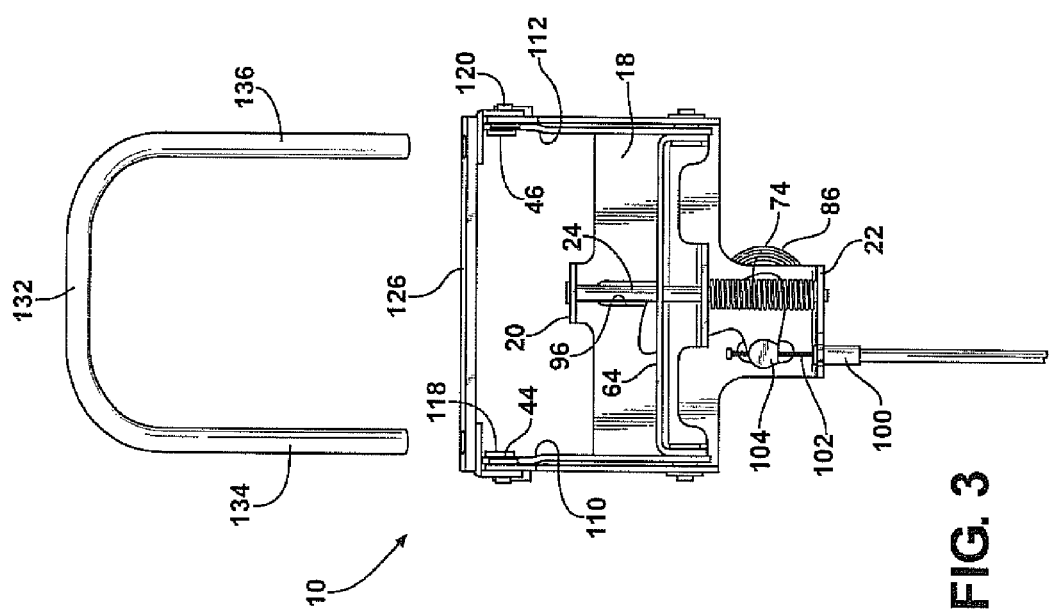
FIG. 3 is a front plan view of the headrest assembly shown in FIG. 2.

A cable is provided and includes an outer sheath 100 affixed to a location of the bracket, such as corresponding to the lower mounting location 22. An inner translatable portion 102 extends from the outer sheath 100 and connects to the hook supported rivet 92 (which is again mounted to the hook a spaced distance from its pivot 82 point relative to the bracket). As shown in FIG. 2, a covering cap 104 is provided and which secures the inner translatable cable 102 relative to the rivet 92. Although not shown, it is understood that a remotely located lever is incorporated and which, upon actuating in a desired fashion, triggers the cable 102 to inwardly displace relative to its fixed outer sheath 100, and thereby to pivot the hook 80 against the biasing force exerted by the clock spring 86, this in order to unseat the catch 98 from the pin 94 and to release the support 64 to displace upwardly in guided fashion along the opposing and aligning channels 28 and 30.

A pair of linkage arms 106 and 108 are sandwiched between the ends of the support 64 (see apertures 70 and 72) and the channels 28 and 30 defined in the side portions of the bracket. Each of the linkage arms further exhibits an elongated and modified arcuate profile with an intermediate and depth defining step, see at 110 and 112, respectively and which better allows the configuration of the linkage arms to be incorporated into the driving mechanism established between the bracket mounted and elevatable/displaceable support 64 and the headrest frame supports 40 and 42.

Each linkage arm 106 and 108 is pivotally slaved, at a first lower end and as is shown by apertures 114 and 116 aligning with the apertures 70 and 72 in the support 64 and for receiving the pins 66 and 68 for securing the linkage arms in alignment within the channel 28 and 30. Additional fastener components include washers 109 and gaskets 111 (again FIG. 1), these assisting in ideally positioning the linkage arms 106 and 108 in sandwiching fashion relative to the inner arrayed end surfaces of the displaceable support 64 and the outer-most positioned and channel defined side portions 32 and 34.

A second upper end of each linkage arm 106 and 108 is pivotally engaged to additional rearward positioned and offset locations associated with each of the pair of headrest frame support portions 40 and 42. Specifically, additional mounting rivets 118 and 120 secure through upper end located apertures 122 and 124 in the linkage arms 106 and 108 (see again FIG. 1), the rivets 118 and 120 being in rearwardly and offset spaced arrangement relative to the mounting rivets 44 and 46. In this fashion, the linkage arms 106 and 108 respond to upwardly slaved displacement relative to the support 64 by exerting a pivoting motion to the frame support portions 40 and 42 about their forward pivot point locations at 44 and 46.

A headrest frame is pivotally secured atop the bracket and supports the headrest bun 14 installed over the headrest frame. As shown, the headrest frame includes a base plate 126 secured to the upper surfaces 56 and 58 of each pivotal support portion 40 and 42 (such as via underside mounting fasteners which insert through apertures 128 and 130 formed through the upper surfaces 56 and 58 (again FIG. 1). The headrest frame further includes a generally U shaped portion, this further including a central portion 132 and first and second downwardly extending and angled ends 134 and 136 which secure the base plate 126.

As further illustrated, a rivet, see at 138 and 140 in FIG. 1, projects from each of the angularly disposed side portions 32 and 34 of the bracket. The rivets 138 and 140 abut the configured undersides 60 and 62 of the headrest supports 40 and 42, when the headrest frame is in the design position of FIG. 5.

Figure 6:
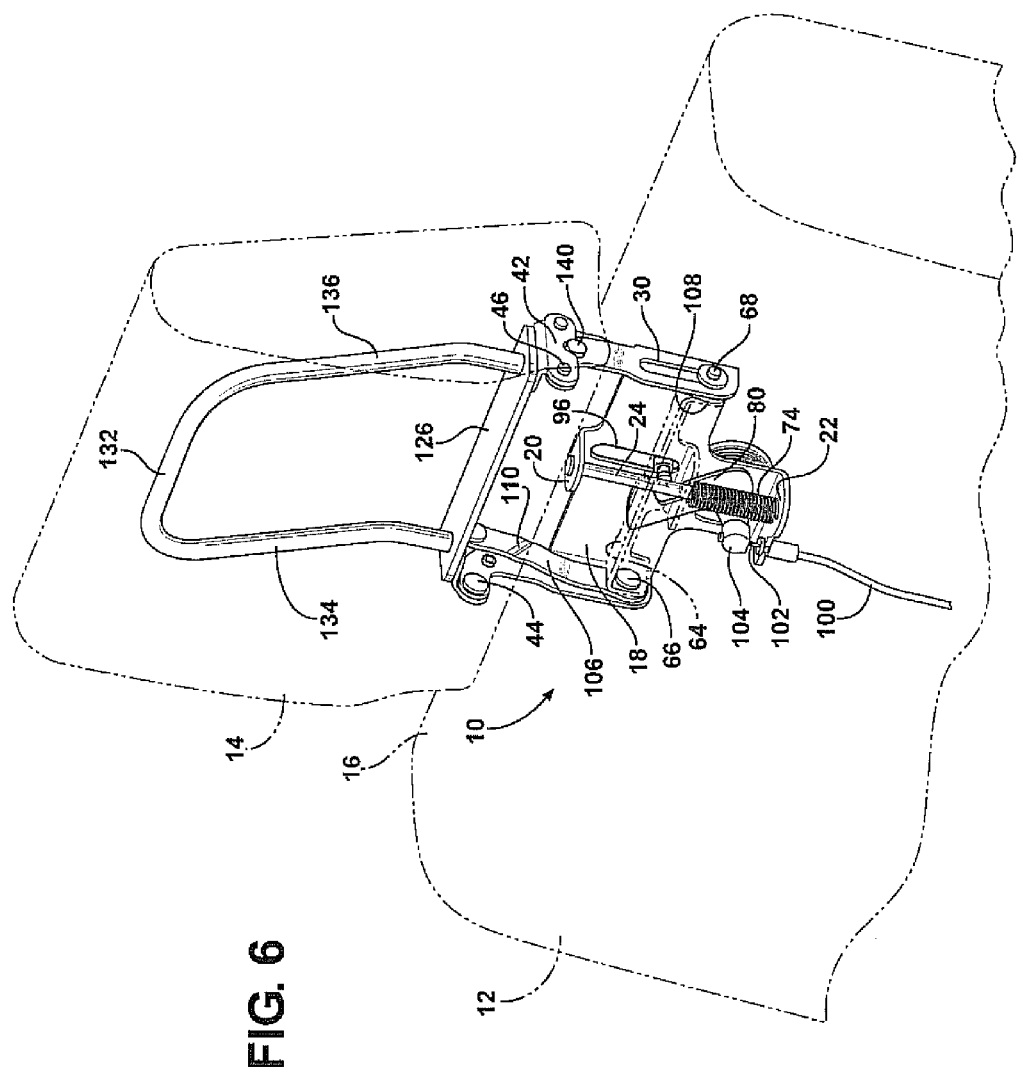
FIG. 6 is a succeeding view to that shown in FIG. 5 and illustrating the cable actuated release hook in an initially triggered and pre-dump condition.
Figure 7:
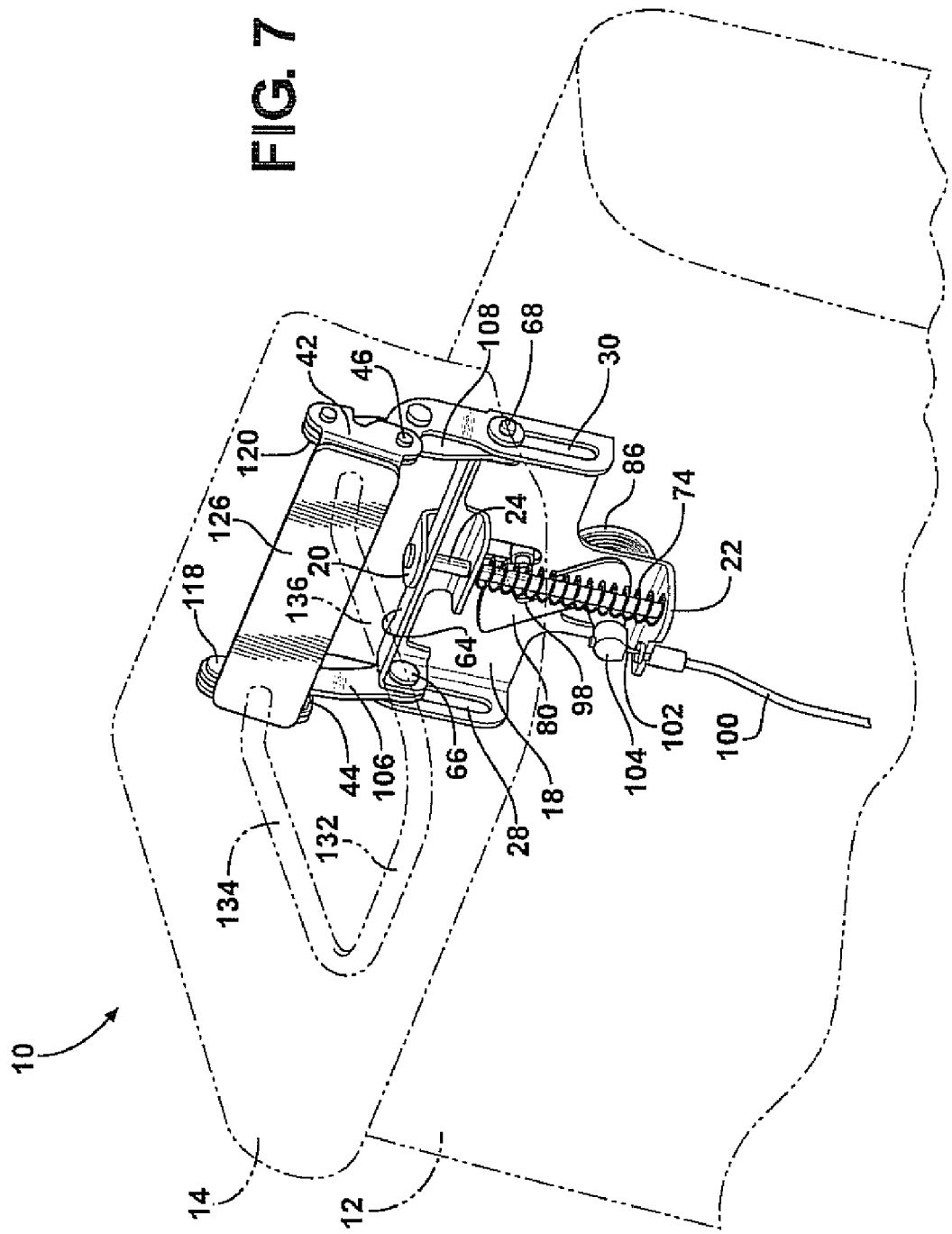
FIG. 7 is a further succeeding view to FIG. 6 and illustrating the upwardly displaceable/pivotal linkages for driving the headrest bun support to the forwardly dumped position.

As further shown, FIG. 6 is a succeeding view to that shown in FIG. 5 and illustrating the cable actuated release hook 80 in an initially triggered and pre-dump condition, such that the catch portion 98 of the hook 80 is in an initially and pivotally displaced condition relative to the pin 94. Referring further to FIG. 7, which is a further succeeding view to FIG. 6, the headrest frame is illustrated in a forward dump position caused by the upwardly displaceable/pivotal linkages 106 and 108, responding to upward biased actuation of the support 64, to rotate the pivotally mounted headrest supports 40 and 42 and, thereby, the headrest frame, for driving the headrest bun 14 to the forwardly dumped position.

Figure 8:
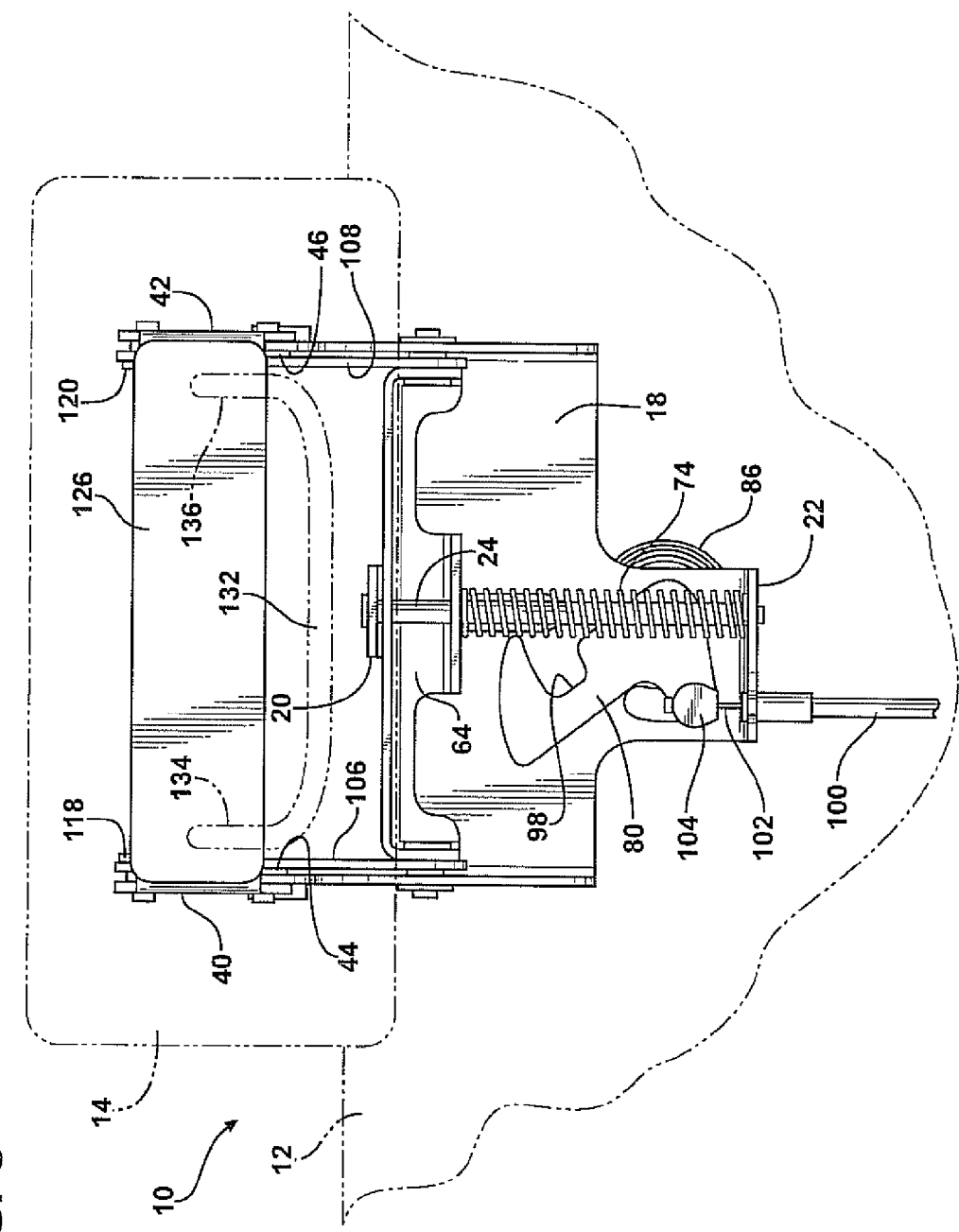
FIG. 8 is a front view of the dumped headrest bun shown in FIG. 7.
Figure 9:
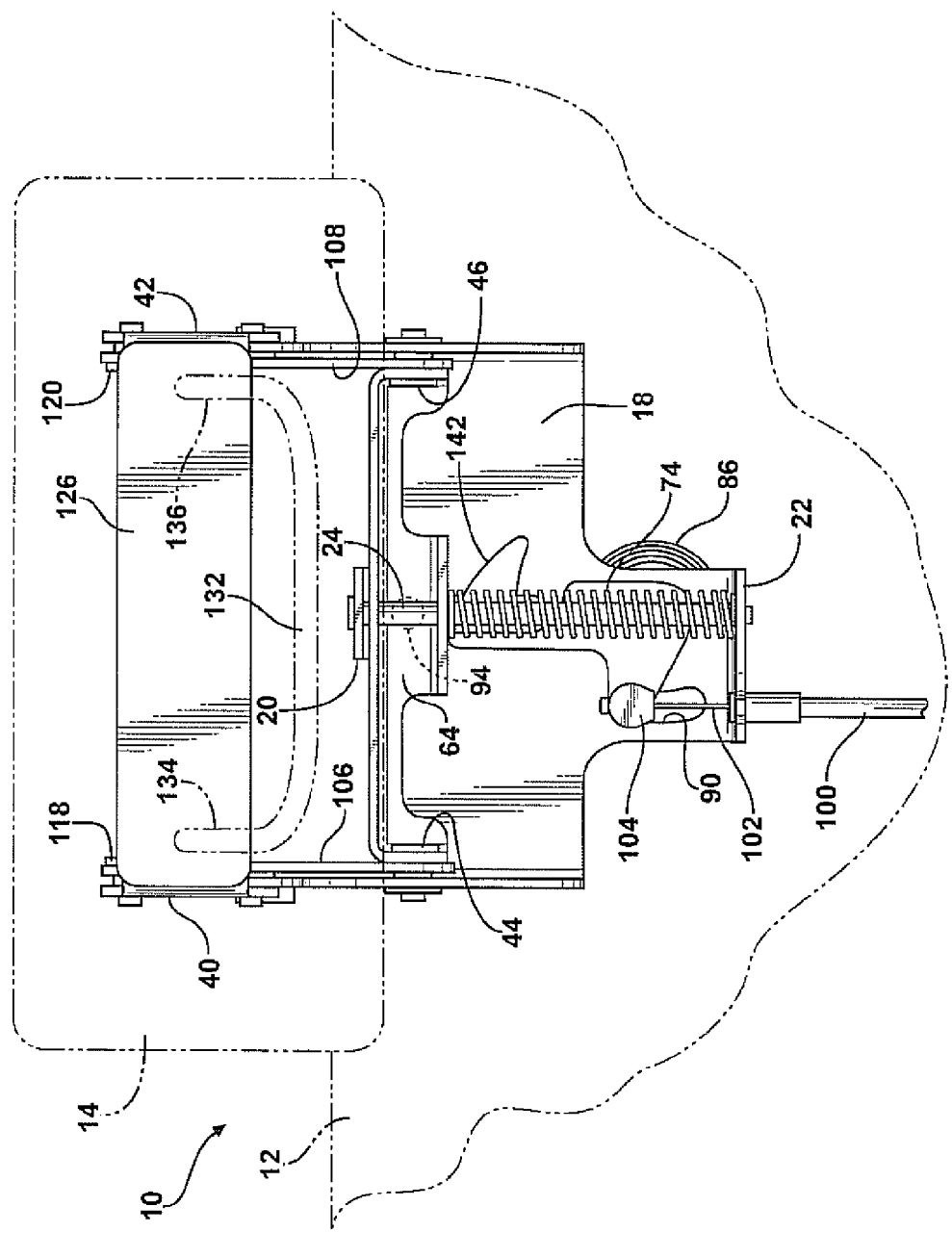
FIG. 9 is an illustration of the release hook reset to a cable relaxed position following completion of headrest dump, the hook further illustrating an upper arcuate profile against which coacts the pin secured to the biased support upon the headrest being reverse actuated to its upright position and at which point the pin reseats within the hook as shown in FIG. 5.

FIG. 8 is a front view of the dumped headrest bun shown in FIG. 7. Finally, FIG. 9 is an illustration of the release hook 80 reset to a cable relaxed position, this following completion of headrest dump. As is further known, the pin 94 coacts against an upper surface arcuate profile 142 of the hook 80, this in response to the headrest being reverse actuated to its upright position, and at which point the pin reseats within the hook as shown in FIG. 5.

Having described my invention, other and additional preferred embodiments will become apparent to those skilled in the art to which it pertains, and without deviating from the scope of the appended claims.

We claim:

1. A pivoting headrest assembly, comprising:
    a bracket incorporated into an upper portion of a vehicle seatback and extending from a top surface of the seatback;
    a support mounted in upwardly biased and displaceable fashion along a channel defined in said bracket, said support being maintained in a first design position by a trigger located upon said bracket;
    a headrest frame pivotally secured atop said bracket, a headrest bun installed over said headrest frame;
    a linkage arm pivotally slaved at a first end to said displaceable support in alignment within said channel, a second end of said linkage arm pivotally engaging said headrest frame at a location offset from a pivotal connection established between said headrest frame and said bracket;
    upon said trigger releasing said support, upward displacement of said support and slaved linkage pivoting said headrest frame about the seatback to a second dump position.

2. The headrest assembly as described in claim 1, said bracket further comprising first and second channels defined in angularly disposed side portions, between which are seated opposite ends of said support.

3. The headrest assembly as described in claim 2, further comprising a pair of linkage arms sandwiched between said ends of said support and said channels defined in said side portions of said bracket.

4. The headrest assembly as described in claim 3, further comprising a pin extending from an intermediate location of said support and seating within a channel defined in a central portion of said bracket.

5. The headrest assembly as described in claim 4, said trigger further comprising a hook shaped component pivotally secured in biased fashion to a lower location of said bracket in order to engage said pin in said first position.

6. The headrest assembly as described in claim 5, further comprising a cable including an outer sheath affixed to a location of said bracket, an inner translatable portion extending from said outer sheath and connecting to a rivet mounted to said hook a spaced distance from its pivot point relative to said bracket.

7. The headrest assembly as described in claim 6, further comprising a clock spring secured to a rear face of said central portion of said bracket and including a leg communicable through an aperture in said central portion for biasing said hook supported rivet toward said first design position.

8. The headrest assembly as described in claim 3, said angularly disposed side portions of said bracket terminating in upper arcuately configured ends, a pair of support portions pivotally securing to said upper configured ends, said support portions each exhibiting a planar and angular extending upper surface and a configured underside which abuts a rivet projecting from each of said angularly disposed side portions when said headrest frame is in said design position.

9. The headrest assembly as described in claim 8, said headrest frame further comprising a base plate secured to said upper surface of each pivotal support portion.

10. The headrest assembly as described in claim 9, said headrest frame further comprising a generally U shaped portion with angled ends securing said base plate.

11. The headrest assembly as described in claim 3, each of said linkage arms further comprising an elongated and modified arcuate profile with an intermediate and depth defining step.

12. The headrest assembly as described in claim 2, further comprising a guide rod extending between first and second mounting locations associated with said bracket, said guide rod seating through a central aperture defined in said support.

13. The headrest assembly as described in claim 12, further comprising a coil spring supported upon said guide rod and biasing an underside of said support in a direction away from said first end and toward said second end.

14. A pivoting headrest assembly incorporated into a vehicle seatback, comprising:
    a bracket incorporated into an upper portion of the seatback and extending from a top surface of the seatback, said bracket further comprising first and second channels defined in angularly disposed side portions;
    a support mounted in upwardly biased and displaceable fashion along said channels defined in said bracket, said support being maintained in a first design position by a trigger located upon said bracket;
    a headrest frame pivotally secured atop said bracket, a headrest bun installed over said headrest frame;
    a pair of linkage arms pivotally slaved at first ends to said displaceable support in alignment within said channels, second ends of said linkage arms pivotally engaging extending sides associated with said headrest frame at locations offset from a pivotal connection established between said headrest frame and said bracket;
    upon said trigger releasing said support, upward displacement of said support and slaved linkage pivoting said headrest frame about the seatback to a second dump position.

15. The headrest assembly as described in claim 14, further comprising a pin extending from an intermediate location of said support and seating within a channel defined in a central portion of said bracket, said trigger further comprising a hook shaped component pivotally secured in biased fashion to a lower location of said bracket in order to engage said pin in said first position.

16. The headrest assembly as described in claim 15, further comprising a cable including an outer sheath affixed to a location of said bracket, an inner translatable portion extending from said outer sheath and connecting to a rivet mounted to said hook a spaced distance from its pivot point relative to said bracket.

17. The headrest assembly as described in claim 16, further comprising a clock spring secured to a rear face of said central portion of said bracket and including a leg communicable through an aperture in said central portion for biasing said hook supported rivet toward said first design position.

18. The headrest assembly as described in claim 17, further comprising a coil spring supported upon said guide rod and biasing an underside of said support in a direction away from said first end and toward said second end.

19. The headrest assembly as described in claim 14, further comprising a guide rod extending between first and second mounting locations associated with said bracket, said guide rod seating through a central aperture defined in said support.

20. The headrest assembly as described in claim 14, said angularly disposed side portions of said bracket terminating in upper arcuately configured ends, a pair of support portions pivotally securing to said upper configured ends, said support portions each exhibiting a planar and angular extending upper surface and a configured underside which abuts a rivet projecting from each of said angularly disposed side portions when said headrest frame is in said design position.

21. The headrest assembly as described in claim 20, said headrest frame further comprising a base plate secured to said upper surface of each pivotal support portion.

22. The headrest assembly as described in claim 14, each of said linkage arms further comprising an elongated and modified arcuate profile with an intermediate and depth defining step.

23. The headrest assembly as described in claim 21, said headrest frame further comprising a generally U shaped portion with angled ends securing said base plate.

* * * * *